3,022,228
NEOMYCIN FERMENTATION PROCESS
William Moses, Teaneck, N.J., assignor to S. B. Penick and Company, New York, N.Y., a corporation of Delaware
No Drawing. Filed Jan. 19, 1960, Ser. No. 3,270
5 Claims. (Cl. 195—80)

The present invention relates to processes for the production of neomycin and is more particularly concerned with an improvement in fermentation media for use in such processes.

Neomycin is an antibiotic elaborated by certain organisms of the Streptomyces genus when grown on aqueous culture media containing an assimilable carbohydrate, proteinaceous material and certain inorganic salts. The requirements of such fermentation media are discussed by Waksman et al. in U.S. Patent 2,799,620.

The subject matter herein described and claimed as the invention resides in the concept of a composition of matter formed by incorporating a mixture of an auxin in a lower aliphatic alcohol with the conventional ingredients utilized for the growth of organisms elaborating neomycin whereby the yield of neomycin is increased and to the improved fermentation methods for the production of neomycin utilizing such compositions.

The term "auxin" is well known in the art of agricultural chemistry and refers to those substances which stimulate or promote the growth of plants and seedlings. The term has acquired a broad generic meaning and is used more or less synonymously with the expressions "plant growth substance" and "plant stimulant." The better known auxins are araliphatic acids of the benzene, naphthalene and indole series wherein the aryl nucleus may be substituted and wherein the aliphatic acid moiety may be the radical of formic, acetic, propionic and other similar aliphatic acids. Typical growth substances are 3-indoleacetic, 3-indolebutyric, 1-naphthaleneacetic, 2-naphthoxyacetic, phenylacetic, phenoxyacetic and 2,5-dimethylphenoxyacetic acids. Auxins are also divided into two specific groups, the general auxins acting on the plant as a whole and the hormone-like auxins which stimulate only the leaves and other chlorophyl generating structures. As used herein the term "auxin" means those general auxins which act on the plant as a whole and not the hormone-like auxins which act almost exclusively on the leaves and chlorophyl generating structures.

The desired auxin is incorporated into the fermentation medium in solution in a lower aliphatic alcohol. As used herein "lower aliphatic alcohol" means those alkanols and alkenols containing one to four carbon atoms inclusive. These alcohols need not be in an anhydrous state but are most conveniently employed as the commercial grade solvent containing a small percentage of water. Further, it is not necessary to use only a single alcohol in a given case but mixtures of suitable alcohols may be utilized. For example, I found that 90.5 percent ethanol, 5.0 percent methanol and 4.5 percent water to be a very effective composition for admixture with the auxin.

Supplementation of nutrient media with an auxin in alcoholic solution has resulted in increasing, by as much as 50 percent, the yield of neomycin produced by standard fermentation procedures. Such improvements were achieved with media whose sugar content varied from about 2.5 to 5.0 percent of the total weight of nutrient medium. The carbohydrate employed was usually hydrolyzed corn starch although other assimilable carbohydrates such as fructose and dextrose may be used. Supplementation of media in which the sugar concentration was above 5.0 percent did not show such significant yield increases over the neomycin produced in unsupplemented media. It is interesting to note that in media of low sugar concentration (below 2.5 percent), the use of alcohol alone as a supplement has shown some increase in the yield of neomycin. That increase, however, was not of the same order of magnitude as that obtained by the use of the auxin-alcohol combination. It is very important to note than an auxin, when added in a form other than in alcohol does not produce significant increases in neomycin yield regardless of the sugar content of the medium.

Concentrations of auxin in the media as low as 1.5 parts per million by weight will give noticeable yield increases in neomycin production. In some instances, as for example with indoleacetic acid, concentrations in the range of 75 parts per million have shown good results. In general, however, the addition of about 7 parts per million of auxin has proven to be most effective. The auxin is most conveniently added to the fermentation media in the form of its alcoholic solution at a concentration of about 50 milligrams per milliliter. Neither the concentration of the auxin in alcohol nor the amount of alcohol used is critical save that the alcoholic solution should contain that amount of auxin dissolved therein which will give an ultimate concentration of about 1.5 to about 75 parts per million of auxin in the complete supplemented fermentation broth. It has been shown that the use of larger amounts of auxin does not increase the yields of neomycin produced and, in fact, may be detrimental to neomycin production. In order to obtain the full beneficial effects of the auxin, the auxin-alcohol supplement should be added to the nutrient media prior to sterilization. Addition of the supplement at later stages of the process did not give comparable yield increases.

The sterilized broth is inoculated with about 4.7 percent of its volume of a Streptomyces inoculum prepared as follows: The stock organism is grown on potato agar slants for six days at 28 to 30 degrees centigrade. The growth is scraped into a flask containing 50 milliliters of sterile broth consisting of 2.5 percent casein hydolysate, 1.0 percent beef extract and the remainder distilled water. After incubation for 48 hours at 28 to 30 degrees centigrade on a shaker rotating at 320 revolutions per minute, the inoculum is ready for use.

The assay procedure used here is a modification of the Neomycin Sulfate Microbial Assay in the United States Pharmacoepia XV at page 855. The results are expressed in terms of neomycin base.

Example I

This example illustrates the increase obtained in neomycin production when the nutrient medium is supplemented with various auxins in alcohol. The nutrient medium used had the following constitution:

| | |
|---|---|
| Cerelose (registered trademark) grams | 187.5 |
| Ammonium sulfate do | 25.0 |
| Potassium chloride do | 20.0 |
| Potassium acid phosphate do | 2.0 |
| Brewer's yeast do | 12.5 |
| Calcium carbonate do | 10.0 |
| Soy flour do | 125.0 |
| Anti-foaming agent do | 2.5 |
| Tap water liters | 5.0 |

Each test series had six flasks. A solution of the test auxin in one milliliter of alcohol (90.5 percent ethanol, 4.5 percent methanol and 5 percent water) to give the indicated concentration was added to the flask. Each concentration was run in duplicate and a series of six flasks was kept for the control. After sterilization for 20 minutes at 121 degrees centigrade, the flasks were inoculated as described above. The flasks were incubated on a rotary shaker (320 revolutions per minute) at 28 to 30 degrees centigrade for 138 hours. The results are tabulated below:

| Test Auxin added in alcohol | Auxin Concentration in parts per million | Neomycin Produced, average mcg./ml. |
|---|---|---|
| alpha-naphthalene-acetic acid | 2.8 / 7.0 / 70.0 | 3,710 / 4,889 / 3,937 |
| p-chlorophenoxyacetic acid | 2.8 / 7.0 / 70.0 | 3,679 / 3,554 / 3,725 |
| indoleacetic acid | 2.8 / 7.0 / 70.0 | 3,621 / 3,563 / 3,737 |
| control | 0.0 | 3,209 |

Example II

The best results obtained here have been with alpha-naphthaleneacetic acid as the auxin. This example illustrates the effect of varying the concentrations of that auxin on the yield of neomycin. The nutrient media and the general procedure used was essentially that of the previous example. The results are tabulated below:

| Auxin Concentration in parts per million | Neomycin Produced, average mcg./ml. |
|---|---|
| 70.0 | 3,448 |
| 35.0 | 3,452 |
| 17.5 | 3,760 |
| 7.0 | 4,407 |
| 2.8 | 3,605 |
| 1.4 | 3,259 |
| 0.0 | 3,209 |

Example III

This example illustrates the effect of varying the carbohydrate content of the basic nutrient medium on the increase in yield of neomycin obtained on auxin-alcohol supplementation. The nutrient media and the general procedure used was essentially that of the first example save that the concentration of the carbohydrate was varied as shown. Alpha-naphthaleneacetic acid was used as the auxin and its concentration was kept constant at 7.0 parts per million. In addition to the 138 hour fermentation, results are reported for the 162 hours' fermentation. The data are tabulated below:

| Carbohydrate concentration, Weight percent of nutrient medium | Neomycin Produced, Average mcg./ml. | |
|---|---|---|
| | Control | Supplemented |
| 2.50 (138 hour fermentation) | 1,883 | 3,162 |
| 3.75 (138 hour fermentation) | 3,405 | 4,318 |
| 4.50 (138 hour fermentation) | 3,466 | 4,038 |
| 2.50 (162 hour fermentation) | 2,275 | 3,540 |
| 3.75 (162 hour fermentation) | 3,644 | 4,412 |
| 4.50 (162 hour fermentation) | 3,790 | 4,044 |

Example IV

This example illustrates the effect of time on supplemented nutrient media containing various concentrations of carbohydrate. The basic broth formulation and the general procedure used was that of the previous example. Assay results after 96, 120, 144 and 168 hours of fermentation at the indicated concentrations of carbohydrate are given below:

NEOMYCIN ASSAY, MCG./ML.

| Time in Hours | 2.5 percent Sugar | | 3.75 percent Sugar | | 4.5 percent Sugar | |
|---|---|---|---|---|---|---|
| | Control | Suppl. | Control | Suppl. | Control | Suppl. |
| 96 | 2,100 | 2,400 | 3,200 | 2,300 | 2,800 | 2,000 |
| 120 | 2,100 | 3,000 | 3,300 | 3,500 | 3,200 | 3,100 |
| 144 | 2,200 | 3,000 | 3,400 | 4,500 | 4,300 | 4,300 |
| 168 | 2,000 | 3,000 | 3,400 | 4,500 | 4,200 | 5,000 |

As can be seen from the above table, the effect of the auxin supplement is not noticeable in the early stages of fermentation, especially in the case of the higher sugar levels. But when the time of fermentation is lengthened, the slight depressive effect observed is overcome and the increase in neomycin production becomes truly significant.

To summarize, it has been discovered that the addition of small amounts of an auxin dissolved in a lower alcohol to fermenation media suitable for the production of neomycin by organisms of the genus Streptomyces results in an increase of the amount of neomycin produced. Ultimate concentrations of the order of 1.5 to 75 parts per million of the auxin in the completed nutrient exhibit this beneficial effect with a concentration of about 7.0 parts per million being preferred. Superior results are obtained when the supplement is added to a nutrient medium containing 2.5 to 5.0 percent of assimilable carbohydrate just prior to sterilization. In order to obtain the desired increase in neomycin production, the auxin was added in conjunction with a lower alcohol. A superior supplement was found to be alpha-naphthaleneacetic acid dissolved in a mixture of lower alcohols containing 90.5 percent ethanol, 5.0 percent methanol and 4.5 percent water. The amount of alcohol added is not critical but a supplement containing about 50 milligrams of auxin per milliliter of alcoholic solvent was found convenient in practicing my invention.

The fermentation media and process herein described and claimed can be used with other antibiotic elaborating organisms of the Streptomyces genus, including, for example, S. griseus, S. aureofaciens, S. venezuela, S. erythreus, S. rimosus, S. noursei, and S. fragilis.

Having described my invention, I claim:

1. In an aqueous fermentation process for the production of neomycin by organisms of the genus Streptomyces, that improvement which comprises incorporating an araliphatic acid auxin of the benzene, naphthalene and indole series and a lower aliphatic alcohol supplement into the culture medium.

2. In an aqueous fermentation process for the production of neomycin by organisms of the genus Streptomyces, the improvement which comprises incorporating a supplement containing an araliphatic acid auxin of the benzene, naphthalene and indole series in admixture with a lower aliphatic alcohol into the culture medium.

3. An improved process for the production of neomycin which comprises growing Streptomyces fradiae in an aqueous nutrient medium containing assimilable carbohydrate, proteinaceous material and necessary inorganic salts supplemented with about 1.5 to 75 parts per million of an araliphatic acid auxin of the benzene, naphthalene and indole series in admixture with a lower aliphatic alcohol.

4. The process according to claim 3 wherein the supplement contains about seven parts per million of alpha-naphthaleneacetic acid with respect to the completed nutrient medium.

5. The process according to claim 4 wherein the alpha-naphthaleneacetic acid is dissolved in a mixture of aqueous methyl and ethyl alcohols.

References Cited in the file of this patent

Grace: Canadian Journal of Research, vol. 15, Section C, pages 538–546, November 1937.

Brannon et al.: American Journal of Botany, vol. 26, pages 271–79, 1939.